Dec. 16, 1952     H. J. LEIDEL     2,621,439
ARTIFICIAL FISH LURE
Filed April 3, 1950
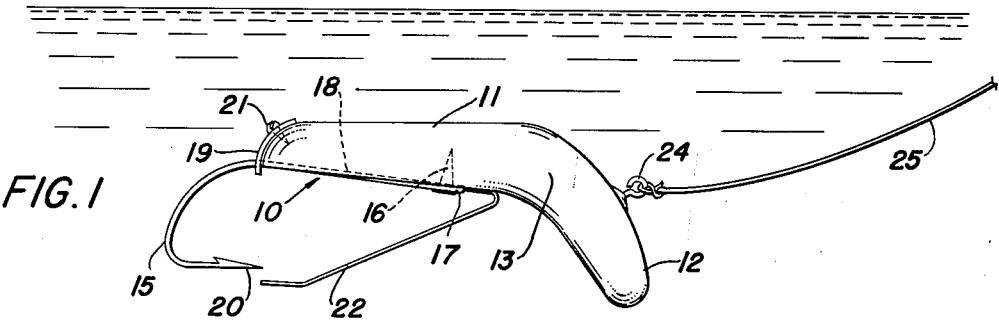
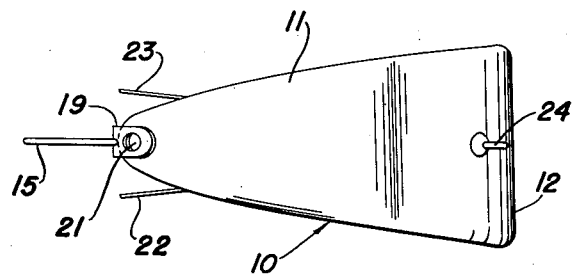
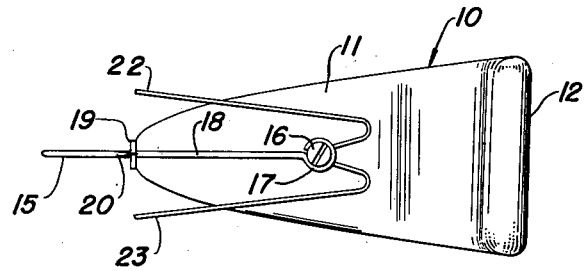
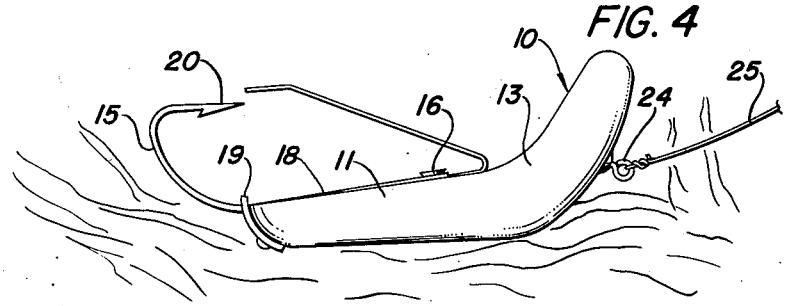
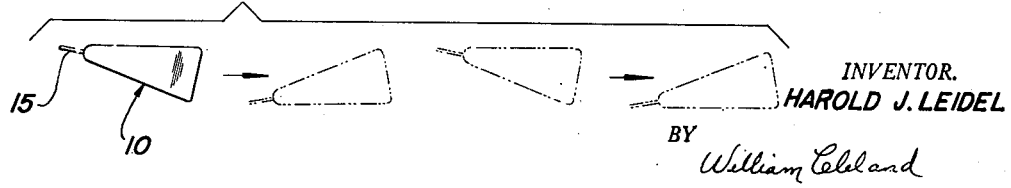
INVENTOR.
HAROLD J. LEIDEL
BY William Cleland
ATTORNEY

UNITED STATES PATENT OFFICE 2,621,439

ARTIFICIAL FISH LURE

Harold J. Leidel, Wadsworth, Ohio

Application April 3, 1950, Serial No. 153,598

4 Claims. (Cl. 43—42.48)

This invention relates to artificial fish lures.

In the past, fish lures or baits for casting or trolling purposes have been either the type known as surface baits, which move along the surface of the water, or so-called under-water type. Both of these types, however, became useless upon being drawn through weed patches.

One object of the present invention is to provide an improved bait which when drawn through the water normally wiggles laterally from side to side beneath the surface, and then, upon contact with a weed patch, automatically assumes an inverted position and rides over the top of the weeds.

Other objects of the invention will be manifest from the following brief description and the accompanying drawings.

Of the accompanying drawings:

Figure 1 is a side elevation of an artificial lure embodying the features of the invention, in normal use as an under-water bait.

Figure 2 is a top plan view of the lure as shown in Figure 1.

Figure 3 is a bottom plan view thereof.

Figure 4 is a side elevation of the lure in inverted position, illustrating the same after it has contacted a patch of weeds and riding on top of the same.

Figure 5 is a top plan view on a reduced scale, partly in full and partly in chain-dotted lines, illustrating the action of the artificial lure as it is drawn through water in the normal upright position of Figure 1.

Referring to the drawings generally, the form of the improved bait or lure shown includes an elongated body 10 of suitable buoyant material, such as wood, the same being of generally flattened transverse cross-section, approximating one-half inch in thickness throughout, and being relatively broad at the front of the bait (approximately one and one-half inches), tapering rearwardly to about a three-sixteenth inch radius. At the forward end of the body, from a point approximating two thirds the total length of the lure, there is an integral angular portion of the same which extends in a general plane at a downward and forward inclination to the general plane of the main body part, considering the lure in a normal horizontal position beneath the surface of the water, as best shown in Figure 1. The extension or deflector 12 is substantially the same width as the widest part of the main body and is connected thereto by a relatively large arcuate portion 13. The extension is of substantially the same thickness as the major portion of the body and the central portion of the upper surface of the extension is substantially flat from side edge to side edge of the extension and of broad lateral area with the general plane of substantially the entire upper surface thereof longitudinally at an obtuse angle to the flat upper surface of said major portion of the body. The juncture of the flat horizontal top surface of the body and the flat front face of the extension is of substantially uniform curvature from side edge to side edge of the body at said juncture. Deflector part 12 may be so constituted to present a front or upwardly presented face thereof in a general plane at a lateral inclination to a vertical plane including the longitudinal axis of said flat horizontal top surface of the body. Stated otherwise, the general plane of said upper surface of the extension is at a slight angle laterally and rearwardly from one side edge thereof with respect to a plane through said one side edge normal to said vertical plane through the longitudinal axis of the horizontal top surface of the body. This lateral inclination or angle of the deflector part 12 is other than ninety degrees but is insufficient to effect inversion or turning movement of the lure on its longitudinal axis as the same is normally drawn through substantially weed-free water but is sufficient to effect inversion of the lure upon contact of the forward face of the deflector 12 with a weed patch in the water, that is, to the position shown in Figure 4, as will be described later.

A single-barb fish-hook 15 is shown secured to the underside of the lure, as by a screw 16 received through the eyelet 17 at the end of the shank 18 of the hook and screwed into the body at approximately the longitudinal center of the same, the shank extending rearwardly against the flat under surface of the body, and the curved portion of the hook being extended beyond the extreme small end of the body with the barbed end 20 presented below the small end of the body. Hook 15 is further secured to the body by said shank being received through an apertured plate 19, which is curved to fit around the small end of body part 10 and attached thereto by a screw 21.

A pair of spring wire weed guards 22, 23 are attached to the under-side of body part 10, by means of said screw 16, to extend in rearwardly divergent relation, and at a downward inclination to adjacent or slightly below the barbed end 20 of the hook 15.

A screw eyelet 24 may be secured in the forward face of deflector part 12, centrally thereof as shown, for attachment thereto of the usual fishline 25.

In use of the above-described fish lure, it may be cast into the water at the end of a line and reeled in or otherwise drawn through the water. If the water is substantially free of weeds the bait will move forwardly beneath the surface, with the main body part in a horizontal plane, and with the deflector 12 inclined downwardly as best shown in Figure 1. So long as the water remains free of weeds the pressure thereof on the forward face of the deflector 12 is only effective to impart to the lure a slight wiggling action, somewhat as indicated in full and chain-dotted lines in Figure 5, and there will be no tendency for the lure to turn over. Should the deflector 12, however, come into contact with the edge of a patch of weeds of the type which float near the surface of the water, the initial impact against the laterally inclined forward face of the deflector will be effective to invert the lure, which will then ride on its relatively flat bottom over the top of the weeds, somewhat as shown in Figure 4. The lure will slide over the weeds much in the manner of a snow sled, until it reaches clear water again, when it will automatically return to the normal position of Figure 1. The weed guards 22, and 23, in addition to the deflector 12, are substantially effective to prevent weeds from fouling with the forwardly extended barbed end of the hook.

The body 10 of the lure, instead of being wood as described, may be of hollow molded plastic material for buoyancy.

For deep-running fishing the body 10 may be of the sinker type, that is, made of heavy material, such as solid plastic, weighted wood or plastic (not necessarily solid), and including the twisted forward portion 12, hook 15, weed guards 22 and 23, and associated parts. In use of this form of bait, however, it will sink to the desired depth in the water depending upon the manner of being retrieved. If during the retrieving movement the body 10 strikes the bottom of a lake or river, contact of the laterally inclined or twisted forward portion 12 with obstacles, such as sand, stones, weeds, or logs, will cause the bait to become inverted as shown in Figure 4, and to ride along in that position until all obstacles have been passed, when the bait will automatically right itself as before.

Other modifications of the invention may be resorted to without departing from the spirit thereof or the scope of the appended claims.

What is claimed is:

1. An artificial fish lure comprising a buoyant body having a substantially flat horizontal top surface of substantially broad lateral area, the forward end of said body having an integral extension therefrom at a downward inclination to the plane of said top surface, the forward face of said extension being substantially smooth and even and of broad lateral area extending from side edge to side edge of the extension and being generally in a plane at a downward and forward inclination to the plane of said horizontal top surface, the general plane of the entire forward face of said deflecting extension being at a relatively slight angle laterally and rearwardly from one of said side edges thereof with respect to a vertical plane through said one side edge and normal to a vertical plane through the longitudinal axis of said horizontal top surface, and said angle from said side edge being insufficient to effect inversion of the lure as it is drawn forwardly through substantially weed-free water with said top surface up but being sufficient to effect inversion of the lure upon contact of said forward face with a weed patch in the water, whereby the lure will be drawn over the top of such weed patch in said inverted condition.

2. An artificial fish lure comprising a buoyant body having a major portion provided with a substantially flat horizontal top surface of substantially broad lateral area, the forward end of said body having an integral extension therefrom at a downward inclination to the plane of said top surface, the forward face of said extension being substantially flat and of broad lateral area extending substantially from side edge to side edge of the extension and being generally in a plane at a downward and forward inclination to the plane of said horizontal top surface, the juncture of said flat horizontal top surface and said substantially flat face of the extension being of substantially uniform curvature from side edge to side edge of the body at said juncture, a general plane of said substantially flat forward face of said deflecting extension being at a relatively slight angle laterally and rearwardly from one side edge thereof with respect to a vertical plane through said one side edge and normal to a vertical plane through the longitudinal axis of said horizontal top surface, said angle from said one side edge being insufficient to effect inversion of the lure as it is drawn forwardly through substantially weed-free water with said top surface up but being sufficient to effect inversion of the lure upon contact of said forward face with a weed patch in the water, whereby the lure will be drawn over the top of such weed patch in said inverted condition, said body having at least one fish-hook secured thereto, and line-fastening means being secured to said forward face of the extension.

3. An artificial fish lure comprising a body of buoyant material and having a major portion thereof provided with a substantially flat horizontal top surface in the normal position of the bait in the water, the forward end of said major portion having an integral extension therefrom of substantially the same thickness as the major portion and having an upper surface at a downward inclination to the plane of the top surface of the major portion, the central portion of the upper surface of said extension being substantially flat and of broad lateral area extending from side edge to side edge of the extension, the general plane of the entire upper surface of the extension being longitudinally at an obtuse angle to the top surface of the major portion and laterally at an angle other than ninety degrees to a vertical plane including the longitudinal axis of said plane of the top surface of the major portion, line securing means on the forward face of the extension secured medially thereto, said last angle being insufficient to effect inversion of the lure as it is drawn forwardly through substantially weed-free water with said top surface up but being sufficient to effect inversion of the lure upon contact of said forward face with a weed patch or obstruction in the water, whereby the lure will be drawn over the top of such weed patch or obstruction in said inverted condition.

4. An artificial fish lure comprising a body normally adapted to be positioned horizontally beneath the surface of the water when drawn therethrough at the end of a fishline, said body having a major portion thereof provided with a substantially flat horizontal top surface in the normal position of the bait in the water, the forward end of said major portion having an extension therefrom provided with a forwardly and upwardly presented, substantially flat face of broad lateral area extending from side edge to side edge of the extension and adapted by reason of water pressure thereon to tend to urge the body beneath the surface of the water when the body is drawn therethrough, the general plane of substantially the entire said upper surface of the extension being at a slight angle laterally and rearwardly from one of said side edges thereof with respect to a plane through said one side edge normal to a vertical plane through a longitudinal axis of the horizontal top surface of the body, the juncture of said flat horizontal top surface and said flat face of the extension being of substantially uniform curvature from side edge to side edge of the body at said juncture, line securing means on the forward face of the extension secured medially thereto, said last-mentioned angle being insufficient to effect inversion of the lure as it is drawn forwardly through substantially weed-free water with said top surface up but being sufficient to effect inversion of the lure upon contact of said forward face with a weed patch or obstruction in the water, whereby the lure will be drawn along on its said flat horizontal top surface over the top of such weed patch or obstruction in said inverted condition.

HAROLD J. LEIDEL.

REFERENCES CITED

The following references are of record in the file of this patent:

UNITED STATES PATENTS

| Number | Name | Date |
|---|---|---|
| 10,771 | Buell | Apr. 11, 1854 |
| 1,246,162 | Ross | Nov. 13, 1917 |
| 2,270,488 | Withey | Jan. 20, 1942 |
| 2,347,743 | Koering | May 2, 1944 |
| 2,425,272 | Walker | Aug. 5, 1947 |
| 2,506,263 | Bessinger | May 2, 1950 |
| 2,522,179 | Jensen | Sept. 12, 1950 |